United States Patent
Yasuda

(10) Patent No.: US 7,630,013 B2
(45) Date of Patent: Dec. 8, 2009

(54) FOCUS ADJUSTING APPARATUS AND FOCUS ADJUSTING METHOD

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/215,690

(22) Filed: Aug. 30, 2005

(65) Prior Publication Data

US 2005/0285969 A1  Dec. 29, 2005

Related U.S. Application Data

(62) Division of application No. 09/439,555, filed on Nov. 12, 1999, now Pat. No. 7,079,187.

(30) Foreign Application Priority Data

Nov. 19, 1998  (JP)  ................. 10-329564

(51) Int. Cl.
*H04N 5/232*  (2006.01)
(52) U.S. Cl. .................................. 348/345
(58) Field of Classification Search .................. 348/345
See application file for complete search history.

(56) References Cited

U.S. PATENT DOCUMENTS 5,337,084 A * 8/1994 Nakamura ............... 348/345
7,079,187 B1 * 7/2006 Yasuda .................... 348/345
2002/0154909 A1* 10/2002 Yamazaki et al. ........ 396/125

* cited by examiner

*Primary Examiner*—James M Hannett
(74) *Attorney, Agent, or Firm*—Cowan, Liebowitz & Latman, P.C.

(57) ABSTRACT

An apparatus, such as a focus adjusting apparatus, includes a focus adjusting system, a driving device which drives the focus adjusting system from one of a state in which a near-distance object is in focus and a state in which a far-distance object is in focus to the other, and a control device which repeatedly performs determination of a focusing state of the focus adjusting system while causing the driving device to drive the focus adjusting system, and, if the focus adjusting system has been driven in one direction until the number of times of the determination repeatedly performed reaches a predetermined number of times, restrains the focus adjusting system from being driven in the one direction, so that a focus adjusting operation can be appropriately performed.

6 Claims, 9 Drawing Sheets

FOCUS ADJUSTING APPARATUS AND FOCUS ADJUSTING METHOD

CROSS-REFERENCE TO RELATED APPLICATIONS

This application is a divisional of application Ser. No. 09/439,555, filed Nov. 12, 1999, now U.S. Pat. No. 7,079,187, the entire disclosure of which is hereby incorporated by reference.

BACKGROUND OF THE INVENTION

1. Field of the Invention

The present invention relates to a focus adjusting apparatus and a focus adjusting method for use in a variety of video cameras, etc.

2. Description of Related Art

In recent years, video apparatuses such as video cameras have made remarkable progress and are ordinarily provided with an automatic focusing control function, an automatic iris control function, a zooming function, etc., so that the improvements of operability and the increase of functions have been attempted in every part thereof.

With regard to an automatic focusing apparatus, the main trend of nowadays is to use such a method that focus adjustment is performed by detecting, as an AF evaluation value, the sharpness of an image plane from within a video signal obtained by photoelectrically converting an object image with an image sensor or the like, and controlling the position of a focusing lens in such a way as to make the AF evaluation value maximum.

The above-mentioned AF evaluation value is obtained generally by using the level of a high-frequency component of video signal extracted by a band-pass filter for a certain pass band, or the like. In a case where an ordinary object is taken for image pickup, the AF evaluation value becomes larger accordingly as a picked-up image becomes sharper, as shown in FIG. 2, and a point at which the level of the AF evaluation value becomes maximum is determined to be an in-focus point.

In the case of a practical video camera, as shown in FIG. 1, an AF microcomputer 115 performs an automatic focus adjusting operation by causing a focusing lens 105 to move in such a way as to make the output signal level of an AF evaluation value processing circuit 114 maximum.

Then, as shown in FIG. 3, the AF microcomputer 115 performs a minute driving action on the focusing lens 105, and if an in-focus state is determined to have been attained, performs an in-focus processing operation. When no in-focus state is determined to have been attained, if a direction according to which the AF evaluation value becomes larger has been determined, the AF microcomputer 115 drives the focusing lens 105 in that direction, i.e., performs the so-called hill-climbing driving action. When the focusing lens 105 has reached such a position as to correspond to the peak of the AF evaluation value, the AF microcomputer 115 again performs the minute driving action on the focusing lens 105. After that, if an in-focus state is determined to have been attained, the AF microcomputer 115 makes a comparison between the AF evaluation value obtained at that time and the newest AF evaluation value. If a difference between the two AF evaluation values is found to be greater than a predetermined level, the AF microcomputer 115 decides that the driving of the focusing lens 105 be re-started, and performs the minute driving action on the focusing lens 105.

The conventional minute driving action will be described below with reference to FIG. 9. Referring to FIG. 9, which is a flow chart showing a processing operation of the AF microcomputer 115 for the minute driving action, the processing operation starts in step S901. In step S902, an AF evaluation value is taken in from the AF evaluation value processing circuit 114. In step S903, a check is made to find if the AF evaluation value taken in step S902 is larger than an AF evaluation value taken in for the last time. If not, i.e., if the AF evaluation value taken in step S902 is smaller than the AF evaluation value taken in for the last time, the flow proceeds to step S904. If so, i.e., if the AF evaluation value taken in step S902 is larger than the AF evaluation value taken in for the last time, the flow proceeds to step S905. In step S904, the focusing lens 105 is driven by a predetermined amount in a direction reverse to the direction in which the focusing lens has been driven for the last time. On the other hand, in step S905, the focusing lens 105 is driven by the predetermined amount in the same direction as the direction in which the focusing lens 105 has been driven for the last time.

In step S906, a check is made to find if the direction for driving the focusing lens 105 has been determined continuously for a predetermined number of times to be the same direction. If so, i.e., if the focusing lens 105 has been driven in the same direction continuously for the predetermined number of times, the flow proceeds to step S907. If not, i.e., if the focusing lens 105 has not been driven in the same direction continuously for the predetermined number of times, the flow proceeds to step S908. In step S908, a check is made to find if the focusing lens 105 remains in the same area for a predetermined period of time, i.e., if the lens position stays within a predetermined range for a predetermined period of time. If so, the flow proceeds to step S909. If not, the flow proceeds to step S910 to bring the processing operation to an end. In step S907, it is considered that the determination of the direction has been attained, and, then, the flow proceeds to step S910 to bring the processing operation to an end. In step S909, it is considered that the determination of an in-focus state has been attained, and, then, the flow proceeds to step S910 to bring the processing operation to an end.

As described above, while repeatedly performing the decision of re-starting→the minute driving→the hill-climbing driving→the minute driving→the decision of re-starting, the AF microcomputer 115 causes the focusing lens 106 to move in such a way as to always make the AF evaluation value maximum.

However, the above-described conventional focus adjusting apparatus has the following drawbacks.

Since the AF evaluation value is generally the level of a high-frequency component of a video signal extracted by a band-pass filter having a certain pass band, the peak level of the AF evaluation value obtained at an in-focus point does not become constant with respect to individual objects for image pickup.

Thus, there is a possibility that, even if the AF evaluation values for the respective objects are the same value, one object is in focus and the other object is out of focus.

Therefore, for example, when the luminance level of an object has changed, even if the AF evaluation value is increasing with the focusing lens being moved, in some cases, an image of the object is blurred in reality. Then, if the focusing lens remains being moved in the same direction, considering that the AF evaluation value is increasing, the image of the object would become conspicuously blurred.

BRIEF SUMMARY OF THE INVENTION

In accordance with one aspect of the invention, there is provided an apparatus, such as a focus adjusting apparatus, comprising a focus adjusting system, a driving device which drives the focus adjusting system from one of a state in which a near-distance object is in focus and a state in which a far-distance object is in focus to the other, and a control device which repeatedly performs determination of a focusing state of the focus adjusting system while causing the driving device to drive the focus adjusting system, and, if the focus adjusting system has been driven in one direction until the number of times of the determination repeatedly performed reaches a predetermined number of times, restrains the focus adjusting system from being driven in the one direction, so that a focus adjusting operation can be appropriately performed.

In accordance with another aspect of the invention, there is provided a focus adjusting method comprising the steps of repeatedly performing determination of a focusing state of a focus adjusting system while driving the focus adjusting system from one of a state in which a near-distance object is in focus and a state in which a far-distance object is in focus to the other, and, if the focus adjusting system has been driven in one direction until the number of times of the determination repeatedly performed reaches a predetermined number of times, restraining the focus adjusting system from being driven in the one direction, so that a focus adjusting operation can be appropriately performed.

The above and further aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
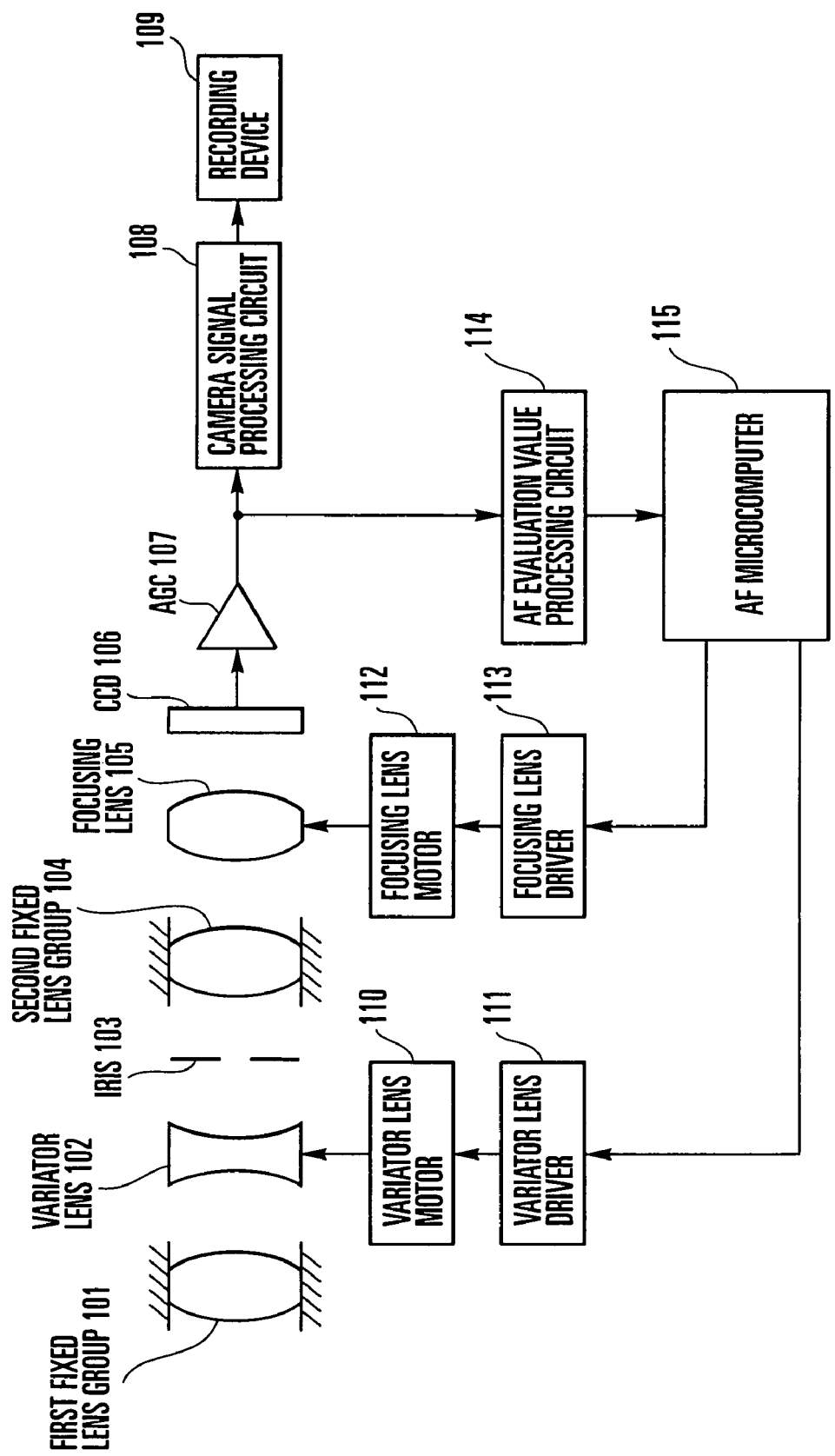
FIG. 1 is a block diagram showing the arrangement of a video camera according to an embodiment of the invention.

FIG. 1 is a block diagram showing the arrangement of a video camera according to the embodiment of the invention. In FIG. 1, reference numeral 101 denotes a first fixed lens group, reference numeral 102 denotes a variator lens for varying magnification, reference numeral 103 denotes an iris, reference numeral 104 denotes a second fixed lens group, and reference numeral 105 denotes a focusing-compensation lens (hereinafter referred to as the focusing lens) having both the function of compensating for the shift of a focal plane caused by the variation of magnification and the function of focusing.

Reference numeral 106 denotes a CCD (charge-coupled device) serving as an image sensor, and reference numeral 107 denotes an AGC (automatic gain control) for amplifying the output of the CCD 106, the amplification factor of which is controlled by the output signal of an AF microcomputer 115 (to be described later). Reference numeral 108 denotes a camera signal processing circuit. Reference numerals 110 and 112 denote actuators (motors) for respectively moving the variator lens 102 and the focusing lens 105, and reference numerals 111 and 113 denote drivers for respectively driving the actuators 110 and 112 in accordance with the output signals of the AF microcomputer 115.

Figure 2:
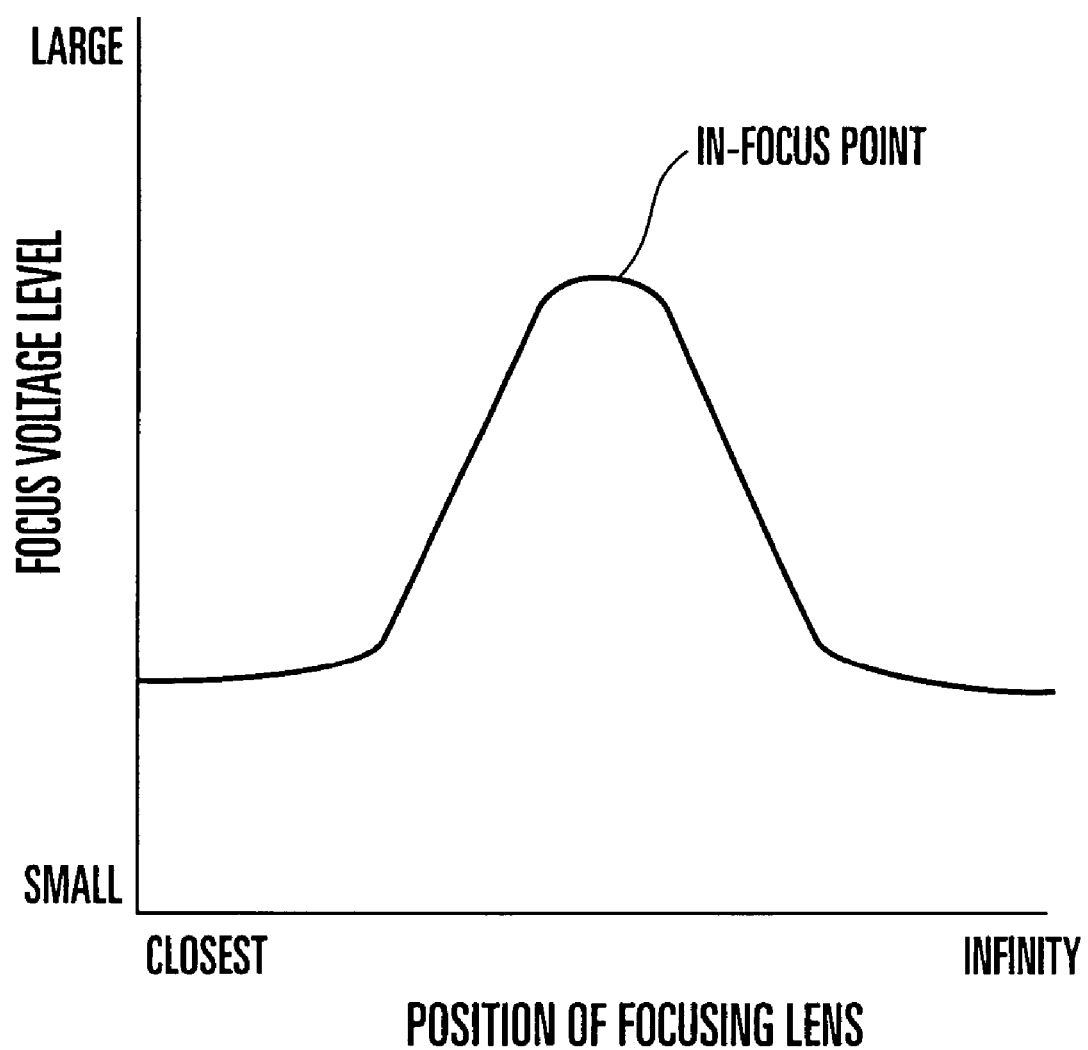
FIG. 2 is a diagram showing the relationship between the position of a focusing lens and a focus voltage level.

Reference numeral 114 denotes an AF evaluation value processing circuit for extracting, as a focus voltage level (AF evaluation value) shown in FIG. 2, a high-frequency component for focus detection from the output signal of the image sensor 106, and reference numeral 115 denotes the AF microcomputer for collectively controlling the entirety of the video camera and for controlling the actuators 110 and 112 on the basis of the output of the AF evaluation value processing circuit 114.

In the video camera having the above-described construction, the AF microcomputer 115 performs a focus adjusting operation by causing the motor 112 and the driver 113 to move the focusing lens 105 in an optical axis direction in such a way as to make the AF evaluation value maximum. Then, the AF microcomputer 115 determines a direction in which the focusing lens 105 is so moved as to increase the AF evaluation value, by making a comparison between AF evaluation values respectively obtained before and after the focusing lens 105 is moved by a predetermined amount, and causes the focusing lens 105 to move in the thus-determined direction by the predetermined amount at each time. If the thus-determined direction is the same continuously for a predetermined number of times, the AF microcomputer 115 inhibits the focusing lens 106 from being moved in that direction, and reverses the moving direction of the focusing lens 105.

A control operation to be performed by the AF microcomputer 115 will be described in detail with reference to FIGS. 3 to 7. First, referring to FIG. 3, which is a flow chart showing a main AF processing operation, the processing operation starts in step S301. In step S302, a minute driving action is performed to determine whether an in-focus state is attained, or, if an in-focus state is not attained, in which direction an in-focus point is located. The details of the minute driving action are described later. In step S303, a check is made to find if an in-focus state has been attained in step S302. If so, the flow proceeds to step S309. If not, the flow proceeds to step S304.

In step S304, a check is made to find if the determination of the direction has been attained in step S304. If so, the flow proceeds to step S305, where a hill-climbing driving action is performed. If not, the flow returns to step S302, where the minute driving action is continued. In the hill-climbing driving action in step S305, the focusing lens 105 is driven at high speed in such a direction as to increase the AF evaluation value in the so-called hill-climbing manner. The details of the hill-climbing driving action are described later.

In step S306, a check is made to find if the AF evaluation value has passed across a peak thereof in step S305. If so, the flow proceeds to step S307. If not, the flow returns to step S305, where the hill-climbing driving action is continued. In step S307, the focusing lens 105 is made to return to the position corresponding to the peak of the AF evaluation value obtained in the hill-climbing driving action. In step S308, a check is made to find if the focusing lens 105 has returned to the position corresponding to the peak of the AF evaluation value. If so, the flow returns to step S302, where the minute driving action is again performed. If not, the flow returns to step S307, where the operation for causing the focusing lens 105 to return to the position corresponding to the peak is continued.

Next, the focusing operation to be performed from step S309 is described. In step S309, the AF evaluation value is memorized. In step S310, the AF evaluation value memorized in step S309 and the newest AF evaluation value are compared with each other, and, if a difference therebetween is found to be larger than a predetermined level, it is decided that the driving of the focusing lens 105 be re-started. In step S311, a check is made to find if it has been decided that the driving of the focusing lens 105 be re-started in step S310. If so, the flow returns to step S302, where the minute driving action is started again. If not, the flow proceeds to step S312. In step S312, the focusing lens 105 is brought to a stop, and the flow returns to step S310, where the decision of the re-start of the focusing lens 105 is continued.

Figure 4:
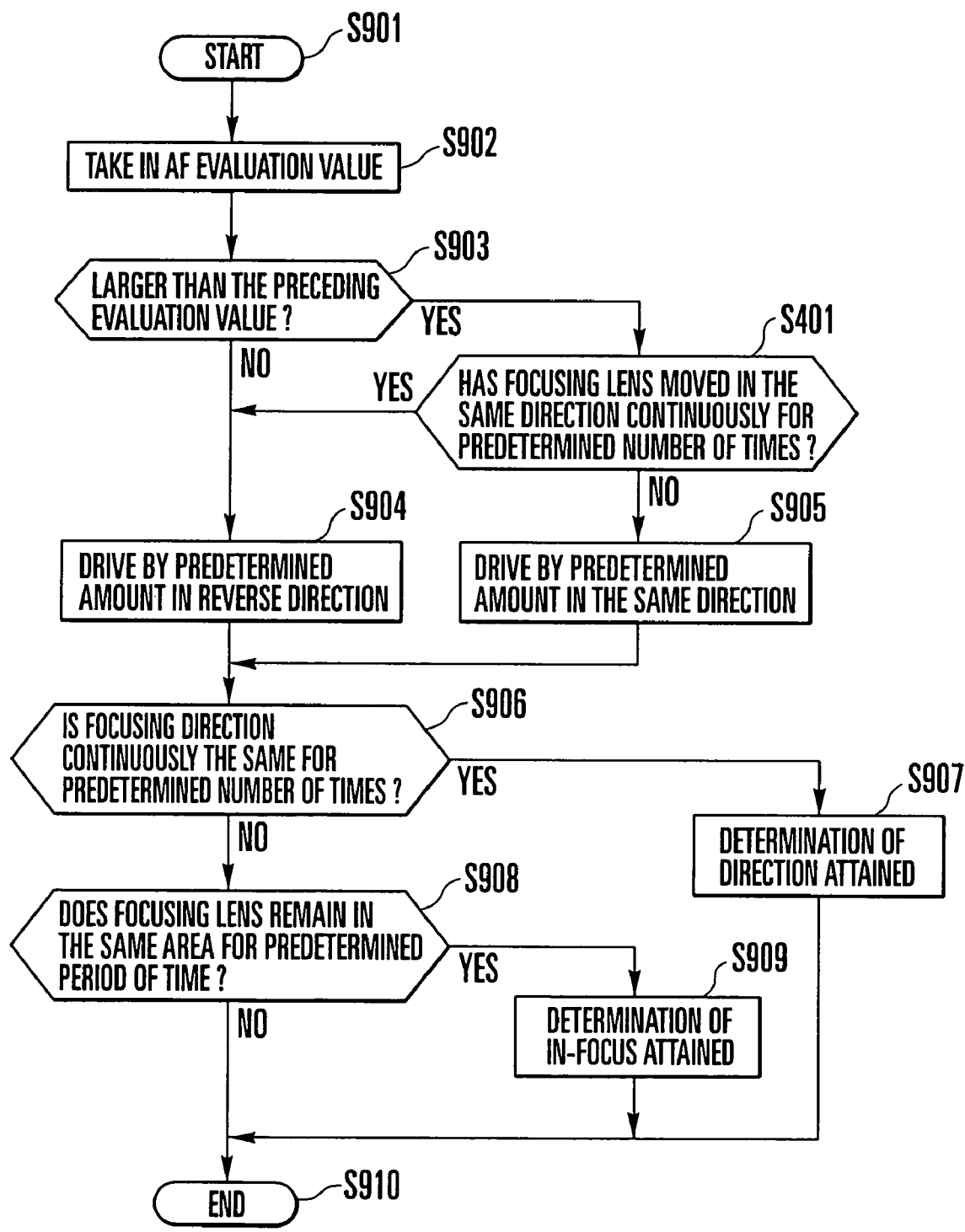
FIG. 4 is a flow chart showing a minute driving action in the embodiment.
Figure 9:
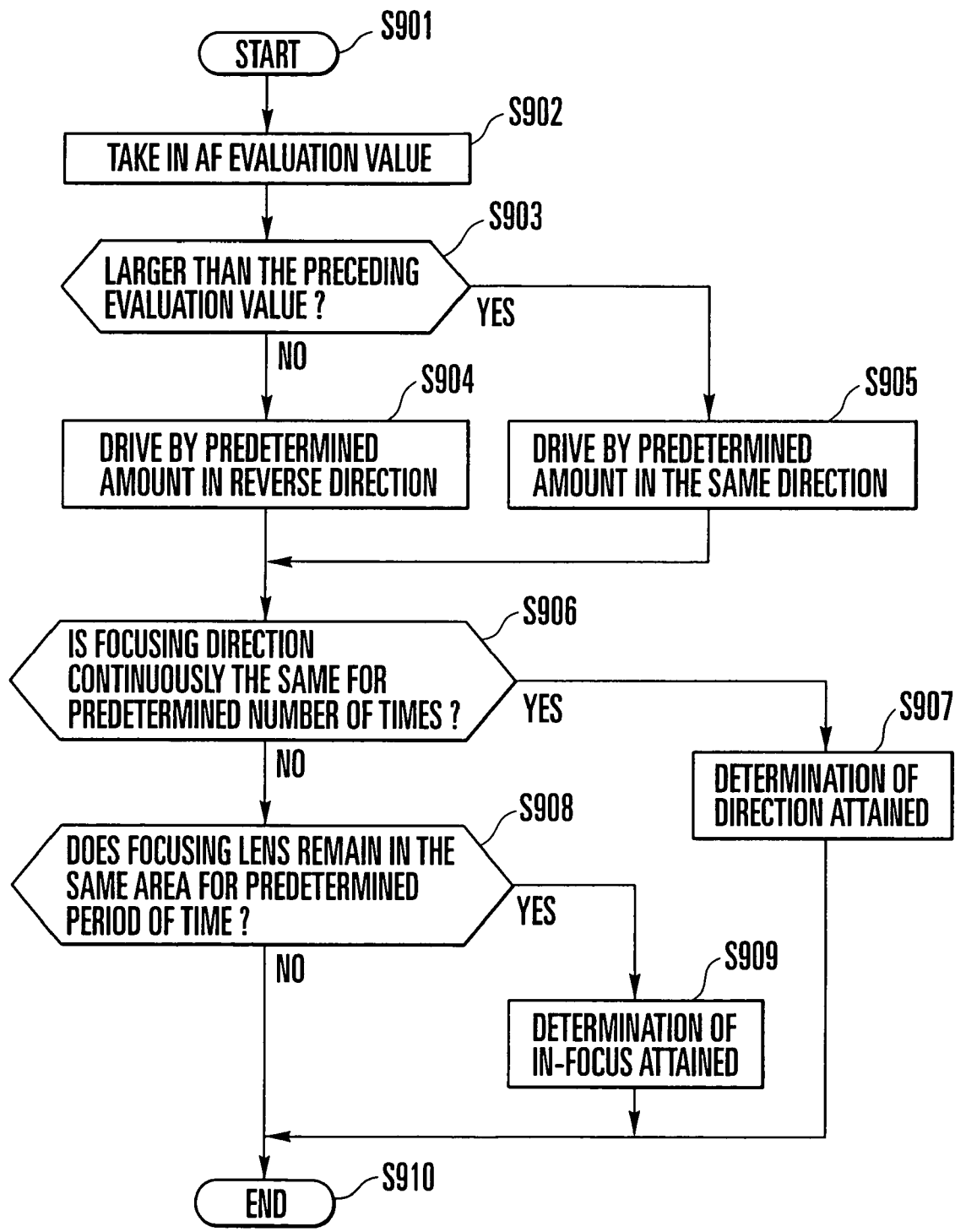
FIG. 9 is a flow chart showing a conventional minuter driving action.

Here, the minute driving action (low-speed driving action) to be performed in the above step S302 is described in detail with reference to Fig. FIG. 4, which is a flow chart showing the control operation of the AF microcomputer 115. The control operation shown in FIG. 4 corresponds to that shown in FIG. 9 described in the foregoing with regard to the conventional minute driving action. In FIG. 4, steps similar to those shown in FIG. 9 are denoted by the same step numbers as in FIG. 9.

In the minuter driving action shown in FIG. 4, the processing operation starts in step S901. In step S902, an AF evaluation value is taken in from the AF evaluation value processing circuit 114. In step S903, a check is made to find if the AF evaluation value taken in step S902 is larger than an AF evaluation value taken in for the last time. If not, i.e., if the AF evaluation value taken in step S902 is smaller than the AF evaluation value taken in for the last time, the flow proceeds to step S904. If so, i.e., if the AF evaluation value taken in step S902 is larger than the AF evaluation value taken in for the last time, the flow proceeds to step S401.

In step S401, a check is made to find if the focusing lens 105 has been moved in the same direction continuously for a predetermined number of times. If so, the flow proceeds to step S904. If not, the flow proceeds to step S905. In step S904, the focusing lens 105 is driven by a predetermined amount in a direction reverse to the direction in which the focusing lens has been driven for the last time. In step S905, the focusing lens 105 is driven by the predetermined amount in the same direction as the direction in which the focusing lens 105 has been driven for the last time. In other words, when the focusing lens 105 has been moved in the same direction for the predetermined number of times or more, even if the AF evaluation value is increasing, the direction in which to drive the focusing lens 105 is reversed. By this arrangement, in a case where an object is varied to cause an increase of the AF evaluation value, it is possible to prevent the focusing lens 105 from being erroneously moved in such a direction as to make an image of the object blurred.

In step S906, a check is made to find if the direction for driving the focusing lens 105 has been determined continuously for a predetermined number of times to be the same direction. If so, i.e., if the focusing lens 105 has been driven in the same direction continuously for the predetermined number of times, the flow proceeds to step S907. If not, i.e., if the focusing lens 105 has not been driven in the same direction continuously for the predetermined number of times, the flow proceeds to step S908. In step S908, a check is made to find if the focusing lens 105 remains in the same area for a predetermined period of time, i.e., if the lens position stays within a predetermined range for a predetermined period of time. If so, the flow proceeds to step S909. If not, the flow proceeds to step S910 to bring the processing operation to an end. In step S907, it is considered that the determination of the direction has been attained, and, then, the flow proceeds to step S910 to bring the processing operation to an end. In step S909, it is considered that the determination of an in-focus state has been attained, and, then, the flow proceeds to step S910 to bring the processing operation to an end.

Figure 5:
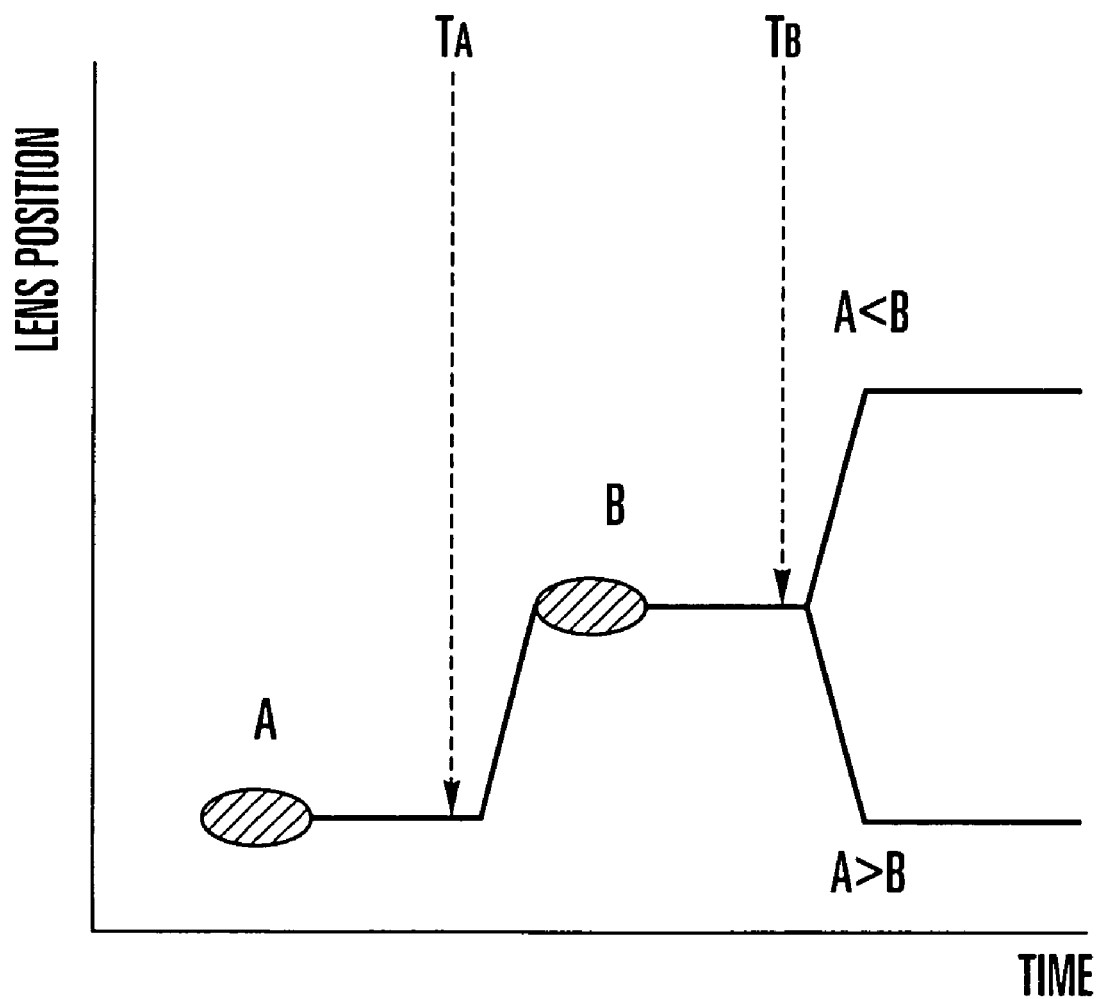
FIG. 5 is a diagram showing the position of the focusing lens relative to the lapse of time.

The position of the focusing lens 105 relative to the lapse of time in the above-described control operation is illustrated in FIG. 5. Referring to FIG. 5, an AF evaluation value A obtained from electric charges accumulated in the CCD 106 during a period of time A is taken in at a point of time $T_A$, and an AF evaluation value B obtained from electric charges accumulated in the CCD 106 during a period of time B is taken in at a point of time $T_B$. At the point of time $T_B$, the AF evaluation values A and B are compared with each other, and if A<B, the focusing lens 105 is moved in the same direction. On the other hand, if A>B, the focusing lens 105 is made to be moved in the reverse direction.

Next, the hill-climbing driving action (high-speed driving action) to be performed in steps S305 and S306 is described with reference to FIG. 6. In the flow chart of FIG. 6, the processing operation starts in step S601. In step S602, an AF evaluation value is taken in from the AF evaluation value processing circuit 114. In step S603, a check is made to find if the AF evaluation value taken in step S602 is larger than an AF evaluation value taken in for the last time. If so, i.e., if the AF evaluation value taken in step S602 is larger than the AF evaluation value taken in for the last time, the flow proceeds to step S604. If not, i.e., if the AF evaluation value taken in step S602 is smaller than the AF evaluation value taken in for the last time, the flow proceeds to step S605.

In step S604, the focusing lens 105 is driven at a predetermined speed in the same direction as that for the last time, and the flow returns to step S602. In step S605, a check is made to find if the AF evaluation value has passed across a peak thereof. If the AF evaluation value has decreased without passing across any peak thereof, the flow proceeds to step S606. If the AF evaluation value has decreased after passing across a peak thereof, the flow proceeds to step S607 to bring the processing operation to an end. In step S606, the focusing lens 105 is driven at the predetermined speed in the direction reverse to that for the last time, and the flow returns to step S602.

Figure 7:
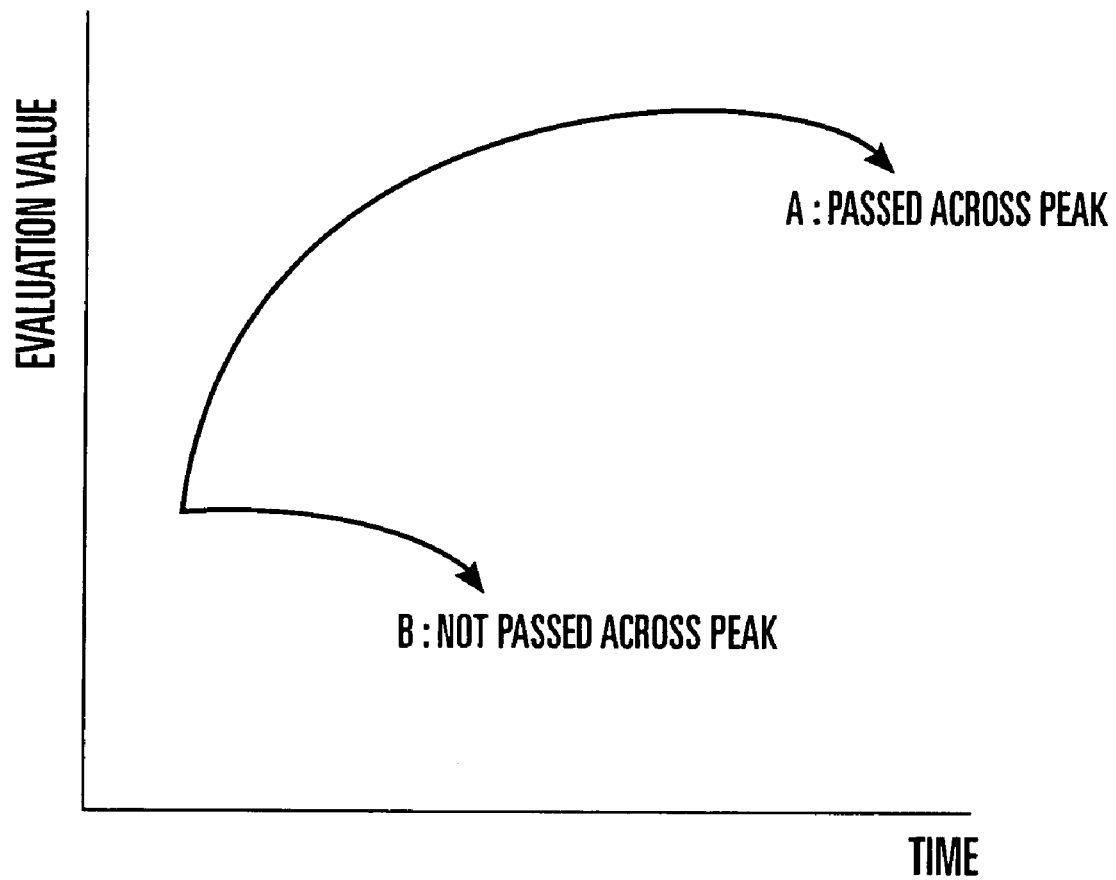
FIG. 7 is a diagram showing the movement of the focusing lens in the embodiment.

The movement of the focusing lens 105 in respect of the AF evaluation value in the above control operation is illustrated in FIG. 7. Referring to FIG. 7, in the case of a locus A, since the AF evaluation value is decreasing after passing across a peak thereof, it is considered that an in-focus point exists, and the hill-climbing driving action is ended and the minute driving action is started. On the other hand, in the case of a locus B, since the AF evaluation value is decreasing without passing across any peak thereof, it is considered that the direction for driving the focusing lens 105 is erroneous, and the direction for driving the focusing lens 105 is reversed and the hill-climbing driving action is continued.

Figure 3:
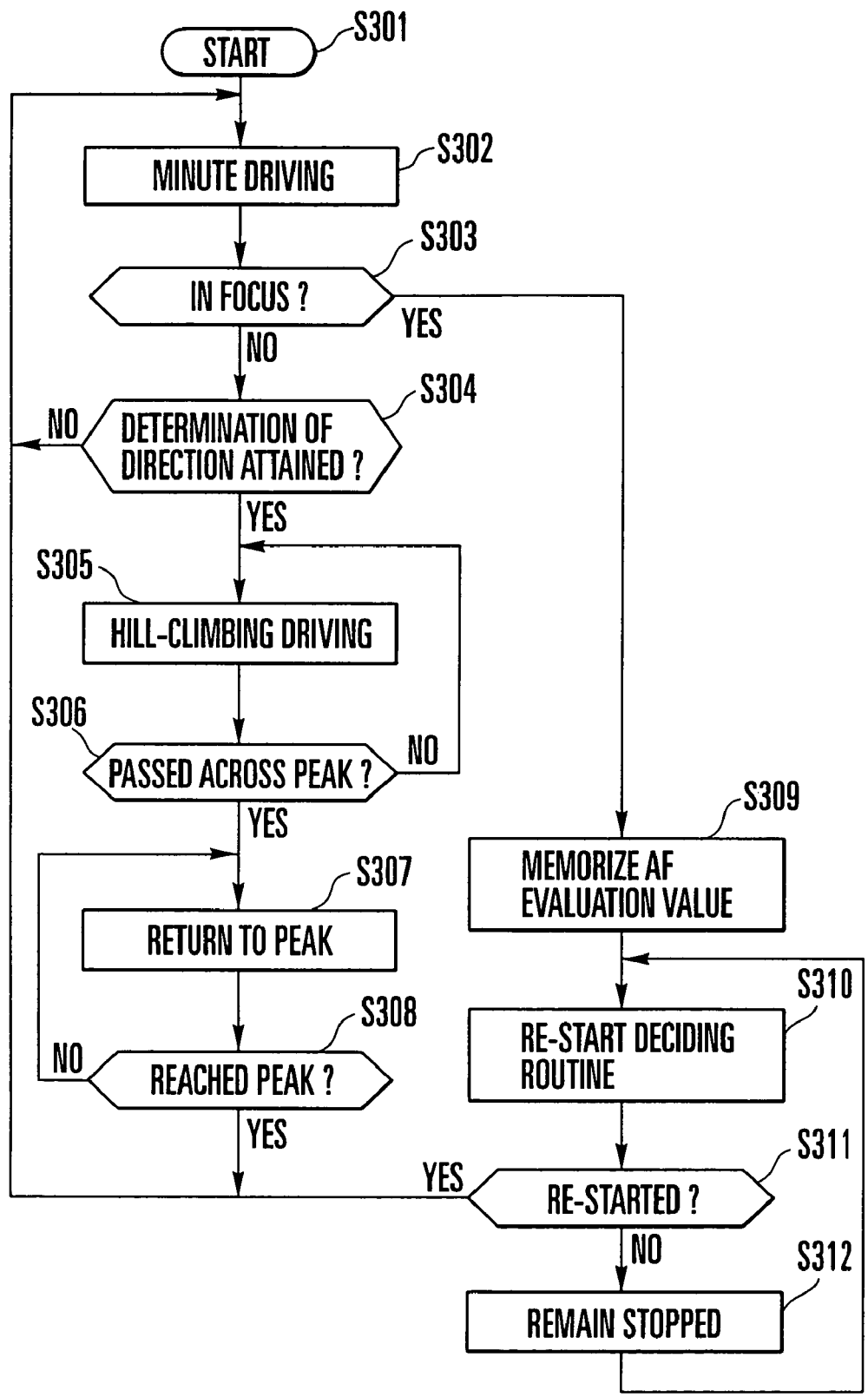
FIG. 3 is a flow chart showing a main AF processing operation in the embodiment.
Figure 6:
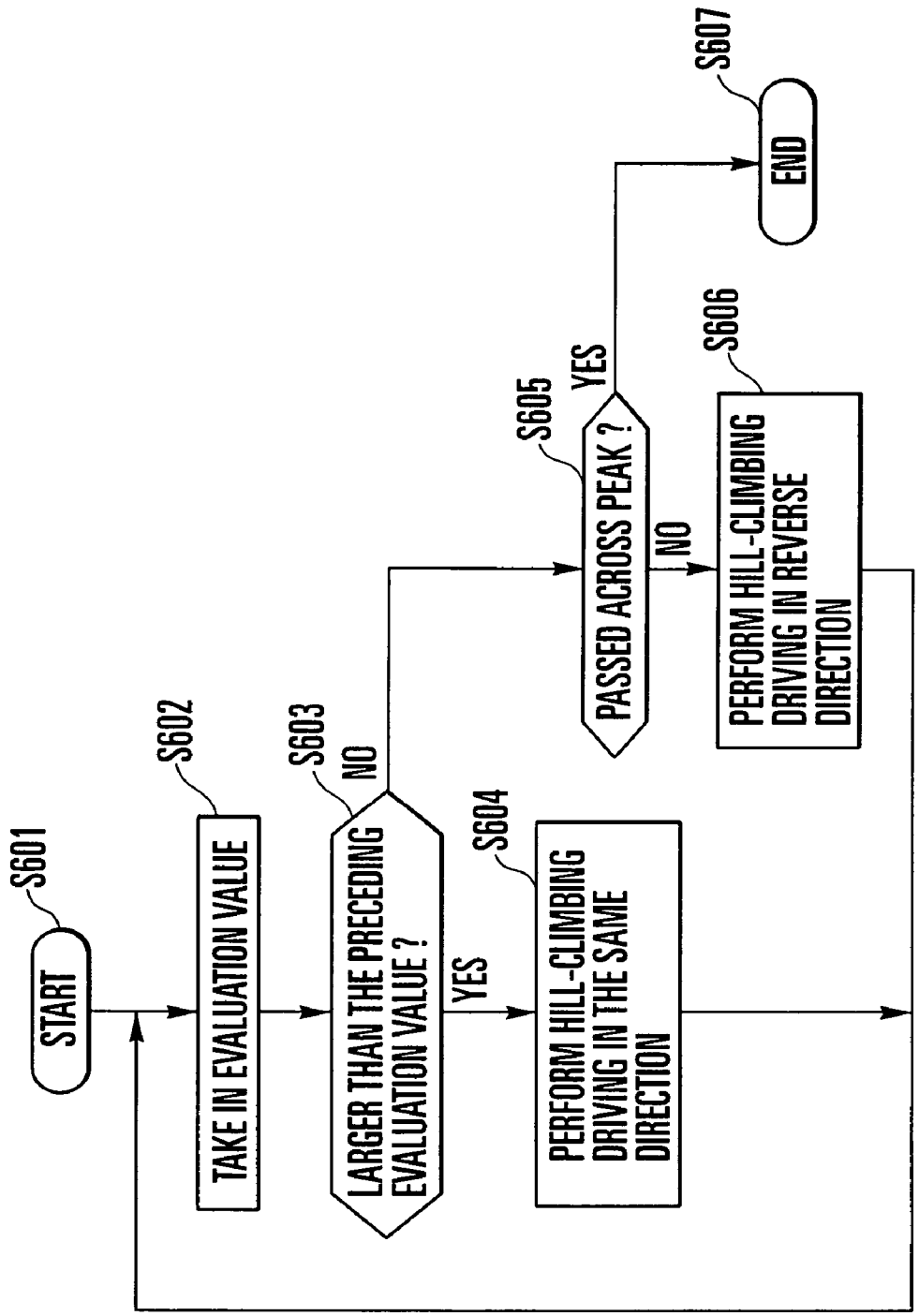
FIG. 6 is a flow chart showing a hill-climbing driving action in the embodiment.

It is to be noted that the processing operations shown in FIGS. 3, 4 and 6 are executed by the instructions of the AF microcomputer 115 on the basis of programs which are beforehand stored in a ROM (not shown).

As has been described above, in the minute driving action, when the AF evaluation value is increasing, the conventional control method would cause the focusing lens 105 to continue moving in the same direction with the processing operation of step S902→step S903→step S905. On the other hand, in the control method according to the embodiment of the invention, if the processing operation of step S902→step S903→step S401→step S905 has been performed continuously for a predetermined number of times, after that, the processing operation of step S902→step S903→step S401→step S904 is performed. Thus, by once reversing the driving direction of the focusing lens 105 in a case where the focusing lens 105 has been moved continuously in the same direction, it is possible to prevent the driving direction of the focusing lens 105 from being erroneously determined due to a change in the AF evaluation value caused by the variation of an object.

Figure 8A:
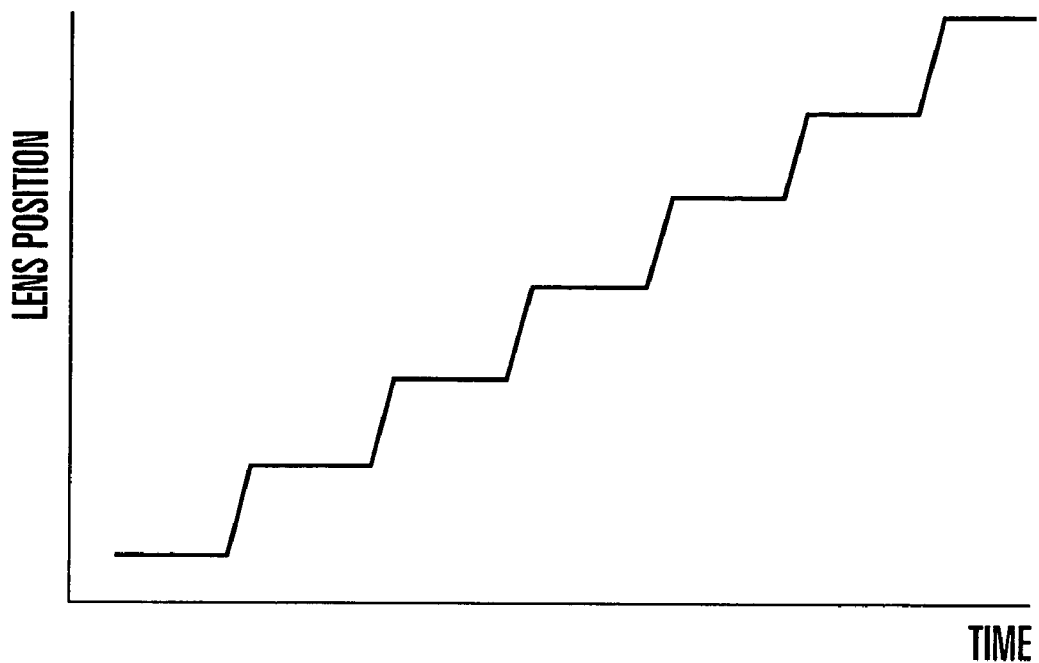
FIGS. 8(a) and 8(b) are diagrams for comparison between the movement positions of the focusing lens.
Figure 8B:
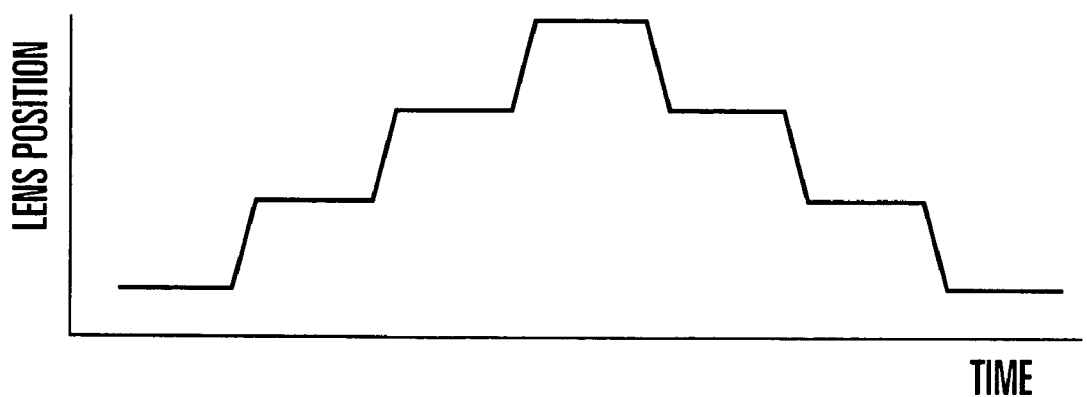

The above movement of the focusing lens 105 is further explained with reference to FIGS. 8(a) and 8(b). In a case where the AF evaluation value is increasing regardless of the movement of the focusing lens 102, according to the conventional control method, the processing operation of step S902→step S903→step S905 is performed, so that the focusing lens 105 would continue being moved in the same direction, as shown in FIG. 8(a). On the other hand, according to the embodiment of the invention, if the processing operation of step S902→step S903→step S401→step S905 has been performed continuously three times, after that, the processing operation of step S902→step S903→step S401→step S904 is performed. Accordingly, it becomes possible to cause the focusing lens 105 to stay at a particular position as shown in FIG. 8(b), so that a reliable focus adjusting operation can be performed.

Thus, according to the embodiment of the invention, by once reversing the driving direction of the focusing lens 105 in a case where the focusing lens 105 has been moved continuously in the same direction, it is possible to prevent the driving direction of the focusing lens 105 from being erroneously determined due to a change in the AF evaluation value caused by the variation of an object. For example, in a case where the AF evaluation value is increasing regardless of the movement of the focusing lens 102, according to the conventional control method, the focusing lens 105 would be continuously moved in the same direction as shown in FIG. 8(a). On the other hand, according to the embodiment of the invention, it becomes possible to cause the focusing lens 105 to stay at a particular position as shown in FIG. 8(b), so that a reliable focus adjusting operation can be performed.

As has been described in the foregoing, according to the embodiment of the invention, by once reversing the driving direction of the focusing lens 105 in a case where the focusing lens 105 has been moved continuously in the same direction, it is possible to prevent the driving direction of the focusing lens 105 from being erroneously determined due to a change in the AF evaluation value caused by the variation of an object, so that a reliable focus adjusting operation can be performed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the above-described embodiment, when the lens has been minutely driven continuously in the same direction, the lens is made to be driven in the reverse direction. However, the driving of the lens in the same direction may be restrained in various fashions other than the driving in the reverse direction, such as the slowing of the driving speed of the lens, the stopping of the driving of the lens, etc.

Further, in the above-described embodiment, when the lens has been driven continuously in the same direction during the minute driving action, the lens is made to be driven in the reverse direction. However, the invention is applicable to any driving action other than the minute driving action.

Further, a focus adjusting system in the above-described embodiment is a type for adjusting focus by moving the lens. However, the invention is applicable to other types of focus adjusting systems, such as a type for adjusting focus by moving the image pickup plane.

Further, the software arrangement and the hardware arrangement in the above-described embodiment may be adaptively replaced with each other.

Further, in the invention, the technical elements of the above-described embodiment may be combined with each other according to necessity.

Further, the invention also applies to cases where each claim or the whole or a part of the arrangement of the embodiment constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses, such as a lens barrel, and other types of apparatuses, and, moreover, to apparatuses adapted for the cameras, the image pickup apparatuses, optical apparatuses and the other types of apparatuses, a method, a computer program product, such as a storage medium, having the method stored therein, and elements constituting the above-mentioned apparatuses, the method or the computer program product.

What is claimed is:

1. An apparatus comprising:
(A) a driving device which drives a focus adjusting system in a direction towards which a level of a high-frequency component becomes high; and
(B) a control device having a first driving mode for determining in-focus direction by controlling said focus adjusting system before a second driving mode for driving said focus adjusting system to in-focus direction, which, in said first driving mode, repeatedly drives said focus adjusting system towards which a level of a high-frequency component becomes high and, if said focus adjusting system has been driven in one direction until the number of times of the determination repeatedly performed reaches a predetermined number of times, inverts said focus adjusting system from being driven in said one direction,
wherein said control device controls said driving device to drive said focus adjusting system in such a direction as to bring said focus adjusting system into an in-focus state, and
wherein, if said focus adjusting system has been driven within a predetermined range for a predetermined period of time, said control device determines that said focus adjusting system is in an in-focus state.

2. An apparatus comprising:
(A) a driving device which drives a focus adjusting system in a direction towards which a level of a high-frequency component becomes high; and
(B) a control device having a first driving mode for determining in-focus direction by controlling said focus adjusting system before a second driving mode for driving said focus adjusting system to in-focus direction, which, in said first driving mode, repeatedly drives said focus adjusting system towards which a level of a high-frequency component becomes high and, if said focus adjusting system has been driven in one direction until the number of times of the determination repeatedly performed reaches a predetermined number of times, inverts said focus adjusting system from being driven in said one direction,
wherein said control device controls said driving device to drive said focus adjusting system in such a direction as to bring said focus adjusting system into an in-focus state, and
wherein, if said focus adjusting system has been driven within a predetermined range for a predetermined period of time, said control device stops driving of said focus adjusting system by said driving device.

3. An apparatus comprising:
(A) a driving device which drives a focus adjusting system in a direction towards which a level of a high-frequency component becomes high; and
(B) a control device having a first driving mode for determining in-focus direction by controlling said focus adjusting system before a second driving mode for driving said focus adjusting system to in-focus direction, which, in said first driving mode, repeatedly drives said focus adjusting system towards which a level of a high-frequency component becomes high and, if said focus adjusting system has been driven in one direction until the number of times of the determination repeatedly performed reaches a predetermined number of times, inverts said focus adjusting system from being driven in said one direction,
wherein said control device controls said driving device to drive said focus adjusting system in such a direction as to bring said focus adjusting system into an in-focus state, and
wherein, if said focus adjusting system has been driven beyond a predetermined range in a predetermined period of time, said control device controls said driving device to drive said focus adjusting system at a faster speed in a direction in which said focus adjusting system has been driven.

4. An apparatus comprising:
(A) a driving device which drives a focus adjusting system in a direction towards which a level of a high-frequency component becomes high; and
(B) a control device having a first driving mode for determining in-focus direction by controlling said focus adjusting system before a second driving mode for driving said focus adjusting system to in-focus direction, which, in said first driving mode, repeatedly drives said focus adjusting system towards which a level of a high-frequency component becomes high and, if said focus adjusting system has been driven in one direction until the number of times of the determination repeatedly performed reaches a predetermined number of times, inverts said focus adjusting system from being driven in said one direction,
wherein said control device controls said driving device to drive said focus adjusting system in such a direction as to bring said focus adjusting system into an in-focus state, and
wherein said control device has the first driving mode for minutely driving said focus adjusting system and the second driving mode for driving said focus adjusting system at high speed, and, in said first mode, if said focus adjusting system has been driven in one direction until the number of times of the determination repeatedly performed reaches the predetermined number of times, restrains said focus adjusting system from being driven in said one direction.

5. An apparatus according to claim 4, wherein, in said first driving mode, if said focus adjusting system has been driven beyond a predetermined range in a predetermined period of time, said control device controls said driving device to drive said focus adjusting system in said second driving mode in a direction in which said focus adjusting system has been driven.

6. An apparatus comprising:
(A) a driving device which drives a focus adjusting system in a direction towards which a level of a high-frequency component becomes high; and
(B) a control device having a first driving mode for determining in-focus direction by controlling said focus adjusting system before a second driving mode for driving said focus adjusting system to in-focus direction, which, in said first driving mode, repeatedly drives said focus adjusting system towards which a level of a high-frequency component becomes high and, if said focus adjusting system has been driven in one direction until the number of times of the determination repeatedly performed reaches a predetermined number of times, inverts said focus adjusting system from being driven in said one direction, and
wherein, in said first driving mode, if said focus adjusting system has been driven beyond a predetermined range in a predetermined period of time, said control device controls said driving device to drive said focus adjusting system in said second driving mode in a direction in which said focus adjusting system has been driven.

* * * * *